Oct. 14, 1947.  C. C. MILLER ET AL  2,428,982
GEAR DRIVE MECHANISM
Filed Jan. 9, 1943  3 Sheets-Sheet 1
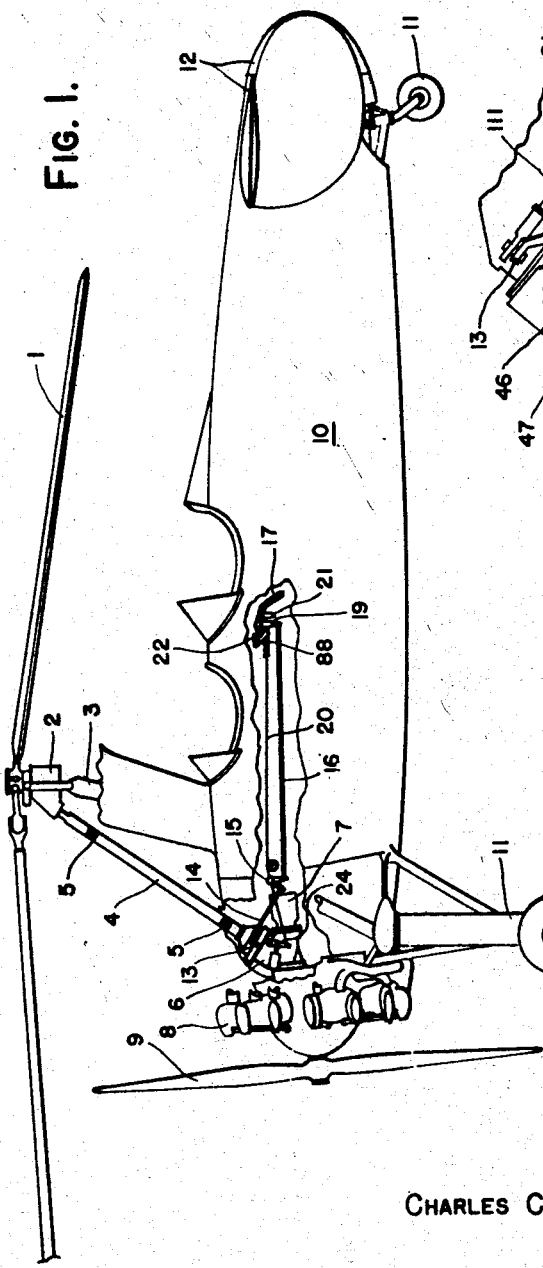
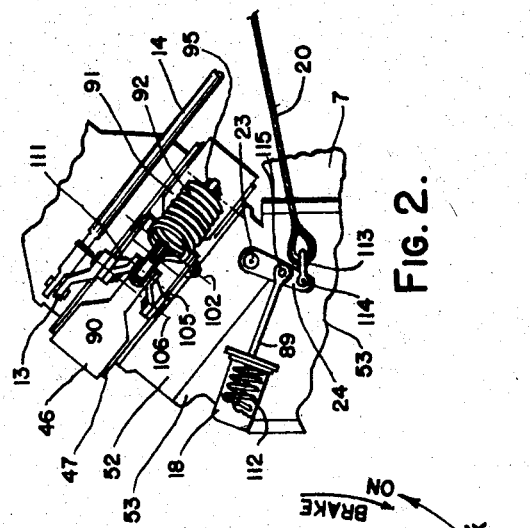
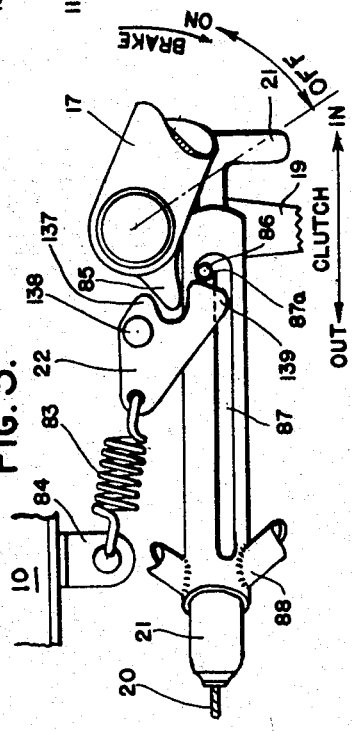
INVENTORS:
CHARLES C. MILLER & RICHARD H. PREWITT.
BY *James M. Clara*
THEIR ATTORNEY.

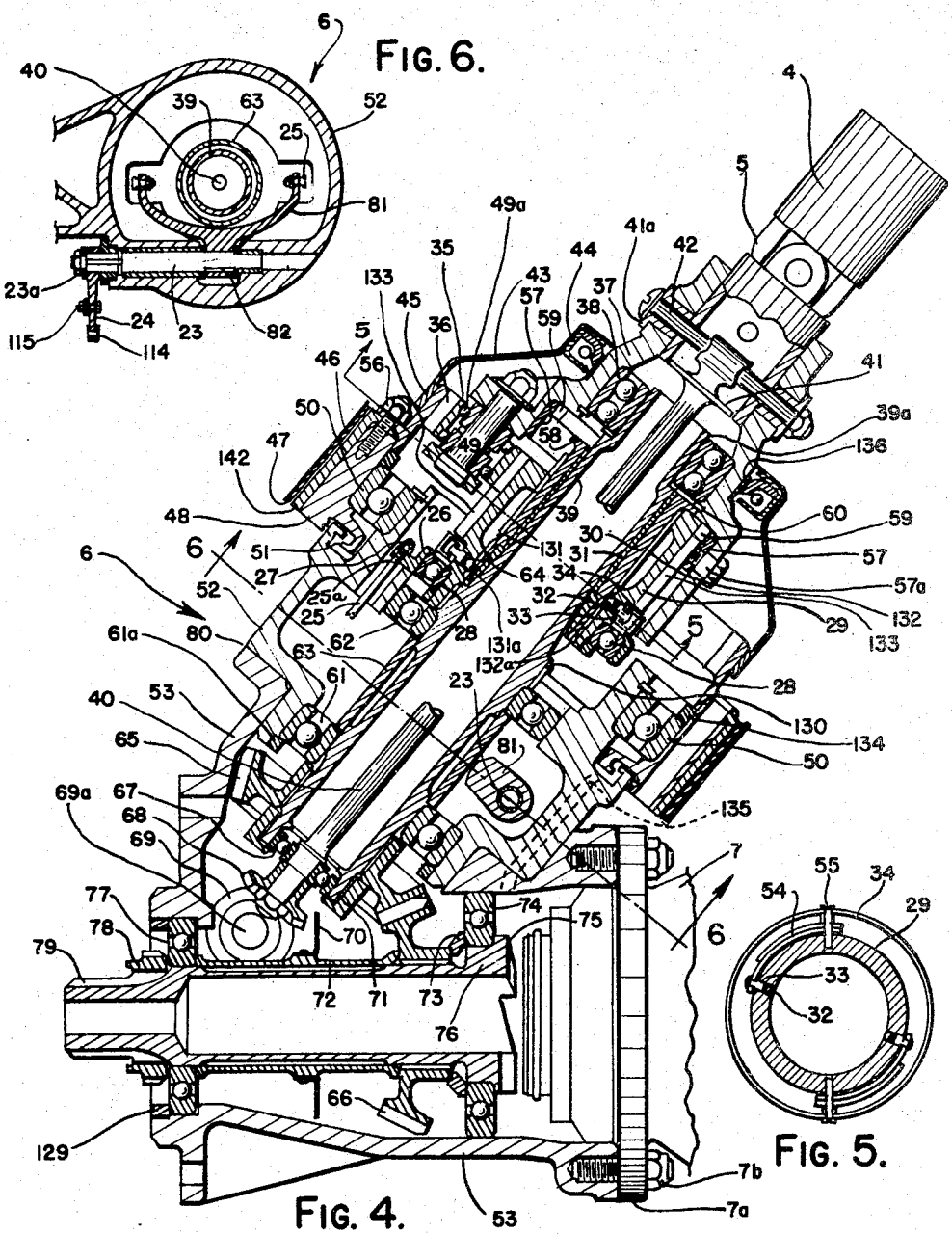

Oct. 14, 1947.　　C. C. MILLER ET AL　　2,428,982
GEAR DRIVE MECHANISM
Filed Jan. 9, 1943　　3 Sheets-Sheet 3
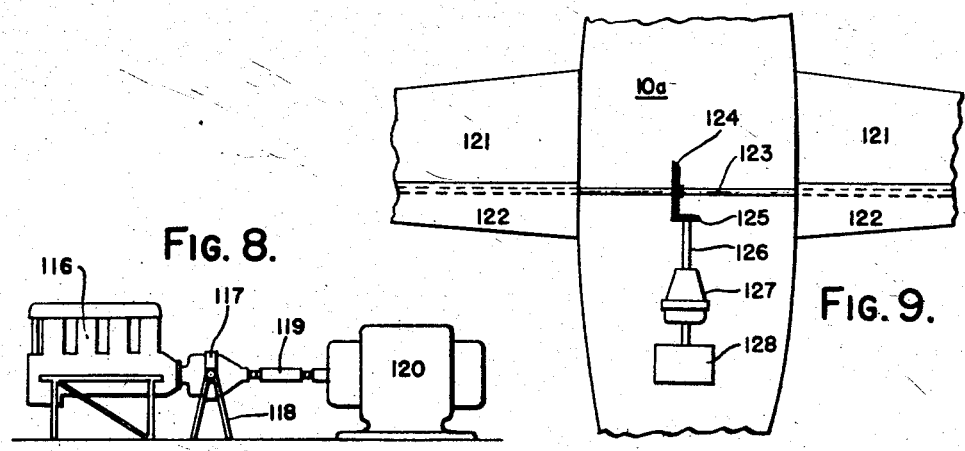
FIG. 8.
FIG. 9.
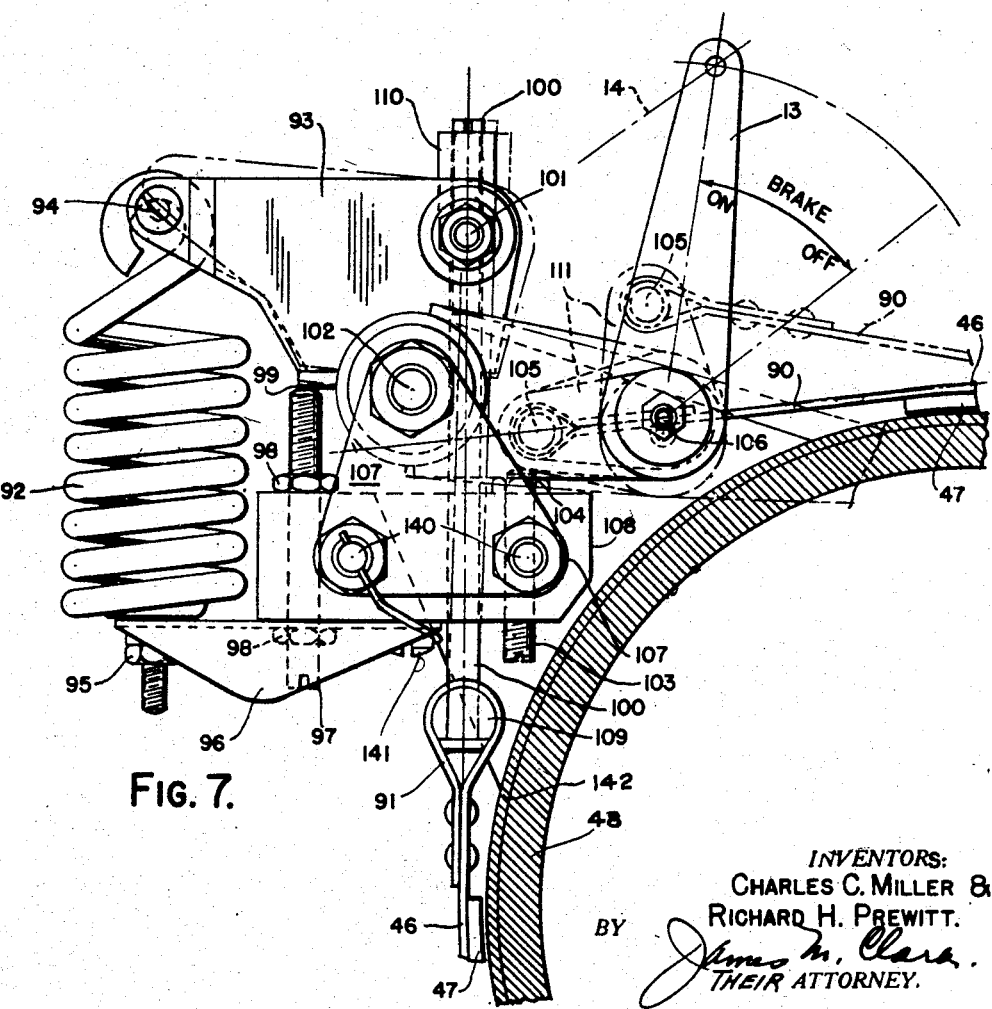
FIG. 7.
INVENTORS:
CHARLES C. MILLER &
RICHARD H. PREWITT.
BY James M. Clara
THEIR ATTORNEY.

Patented Oct. 14, 1947

2,428,982

UNITED STATES PATENT OFFICE 2,428,982

GEAR DRIVE MECHANISM

Charles C. Miller, Springfield, and Richard H. Prewitt, Lansdowne, Pa., assignors to Kellett Aircraft Corporation, a corporation of Delaware Application January 9, 1943, Serial No. 471,820

10 Claims. (Cl. 74—291)

This invention relates to power transmission for rotating elements and more particularly to a combined clutch, brake and automatic torque release mechanism adapted for driving and braking aircraft rotors and like components.

In helicopters and aircraft of the rotary-wing type the aircraft is usually supported by a sustaining rotor system which may either be power driven about its substantially vertical axis by the aircraft power plant, or auto-rotated due to the relative wind acting upon the rotor system as the result of forward flight. It is advantageous in aircraft of these types that means for transmitting a driving torque to the rotor from the aircraft power plant be provided to impart initial rotation to the system prior to take-off and also that the transmitting mechanism be provided with a suitable brake to arrest the rotation of the system when desirable such as immediately upon landing, in order to improve control upon the ground and to otherwise contribute to the safe operation of the aircraft.

The present invention comprises essentially a compact drive mechanism adapted to be driven from the power take-off shaft of the propulsive engine of the aircraft. The drive unit includes essentially a clutch of the synchromesh type, suitably controlled from the cockpit, and a sun gear in constant mesh with a train of planetary gears pivotally carried upon the rotor drive shaft and in turn engaging an external ring gear provided with a band type brake. The brake feature of the present mechanism includes means for its automatic disengagement upon the application of excessive torque thru the transmission unit and is of such construction that a single band is used for both assisting in the engagement of the clutch in the driven condition of the rotor and for applying the brake to the rotor when it is not power driven. The invention also comprehends the provision of an arrangement of the manual control levers for the brake and the clutch in which they are effectively interlocked such that release of the brake automatically releases the clutch from its driven condition, and the disengagement of the clutch is prevented while the brake is in the engaged condition.

The inclusion of the automatic high torque releasing mechanism has been found distinctly advantageous, in that it limits the torque loads which might be transmitted through the transmission system. In the case of the autogiro, the torque is transmitted from the engine to the rotor for accelerating the latter prior to take-off. If the entire transmission system between the engine and rotor were built sufficiently substantial to take any loads which might be imposed on it during the revving-up process, then the parts would be excessively heavy, displacing a higher percentage of the payload of the machine. Accordingly it is a major feature of the present invention to provide an advantageous arrangement of such mechanism whereby the automatic limiting of the torque put through the transmission system is accomplished. Previous arrangements for accomplishing this have included the use of shear pins, but unfortunately such pins become fatigued and shear in time at much lower values than intended. On the other hand, these safety or shear pins frequently jam and will not shear at all, or at least before some other part of the structure has failed.

It is accordingly a principal object of the present invention to provide a power transmission unit which will automatically and completely disengage itself upon the application of excessive torque through the unit. It is a further object of the present invention to provide a drive system for the rotor of an aircraft which is provided with improved pilot operated control mechanism for the clutching, declutching and braking of the rotor system.

It is a further object to provide a compact drive unit which is integrally provided with an external brake of the single band type directly associated with the automatic torque release mechanism. A still further object resides in the provision of novel adjusting mechanism for both the brake band and the torque release features. A further object resides in the provision of such a drive unit in which a single brake band is utilized for both assisting in the engagement of the clutch in the driven condition of the rotor and for applying the brake to the rotor when it is not power driven.

It is a still further object to provide in such a drive system an automatic interconnection between the mechanism which shifts the unit from a clutch system to a brake system with the operation of a brake band. Other objects and advantages will become obvious to those skilled in the art upon reading the present description and the drawings forming a part hereof, in which:

Fig. 1 is an elevational view of an aircraft of the rotative wing type incorporating a power plant, the combined clutch and brake unit and associated drive transmission and operating controls comprising a preferred form of the present invention;

Fig. 2 is an enlarged view of the external mechanism of the brake and clutch unit shown in Fig. 1;

Fig. 3 is a similarly enlarged view of the interlocking operating mechanism as shown in Fig. 1;

Fig. 4 is a detailed cross-sectional view of the brake and clutch unit shown in Figs. 1 and 2;

Fig. 5 is a cross-sectional view of the shiftable portion of the drive unit as taken along the lines 5—5 of Fig. 4;

Fig. 6 is a cross-sectional view of the drive unit, as taken along the line 6—6 of Fig. 4;

Fig. 7 is an enlarged detail view of the brake release toggle mechanism of Fig. 2 as viewed in an axial direction;

Fig. 8 is an elevational view of a modification of the drive unit of the present invention applied to the transmission of power from a driving to a driven unit wherein release at a predetermined torque is desired; and Fig. 9 shows a still further modification of the present invention applied as an automatic clutch release mechanism for operating the flaps on the wing of an airplane.

Referring now to Fig. 1 there is disclosed an aircraft of the rotative wing type provided with a blade system 1, a hub mounting 2 and a pylon support 3 extending between the framework of the fuselage 10 and the rotor system. For purposes of imparting rotation, or braking, or otherwise controlling the rotation of the blade system 1, there is provided a drive transmission between the power plant 8 of the aircraft, in the form of an obliquely disposed drive shaft 4 interconnected with the adjacent portions of the drive system by the universal joints 5. The aircraft shown in Fig. 1 is provided with a conventional fuselage 10, landing gear system 11, a tractor propeller 9 driven by the engine 8, and is also provided with a conventional empennage or tail group 12. A starter 7 is also provided for the motor 8, being selectively engageable by clutches to be described below.

The rotative driving torque from the engine 8 is suitably transmitted to the oblique transmission shaft 4 and the rotor system 1 through the novel brake and clutch drive unit 6, comprising an essential portion of the present invention. In Fig. 1 the operating mechanism for the control of the brake and clutch unit is illustrated by the brake band operating lever 13 disposed alongside the unit 6, the push-pull rod 14, the double bellcrank lever 15, the push-pull rod 16 and the lever 19 pivoted to rotate conjointly with the manual operating lever 17. All of this mechanism, which is shown in the portion of the fuselage broken away in this figure, will be more fully described in connection with the detailed showing in Fig. 3, and serves to tighten the brake band of the unit 6 when the manual lever 17 is rotated upwardly in a counter-clockwise direction as viewed in Fig. 1, and releases the brake when the lever is rotated downwardly in a clockwise direction. The axially shiftable clutch element in the brake-clutch unit 6 is manually controlled through the cable 20, provided with a handle portion 21 at its aft terminal and connected to the operating lever 24, pivotally mounted upon the drive unit 6; the latter clutch control being interconnected with the brake control as will be more fully described in connection with the detailed showing of these controls in Fig. 3.

The combined brake and clutch drive unit 6 shown in the aircraft depicted in Fig. 1 is by no means limited to use in this particular type airplane but is capable of use in a number of transmission installations where its desirable features are to be taken advantage of. It has been shown in Fig. 1 for illustrative purposes only, as applied to the rotor drive of an autogiro of the direct-control jump-takeoff type and it will be understood by those skilled in the art that suitable control mechanism which has not been shown, is provided to tilt or cock the rotative wing assembly with respect to the supporting pylon 3 to obtain the desired direct-control and that there is also provided suitable mechanism for the control of the blade pitch of the rotor system 1. The details of such a rotor control system in themselves form no part of the present invention, but are more fully shown and described in the co-pending application Serial No. 370,572 filed December 18, 1940 of Richard H. Prewitt, one of the present applicants, which application issued December 19, 1944, as Patent No. 2,365,357.

Referring now to the detailed cross-sectional view of the drive unit 6 as shown in Fig. 4, it will be noted that the unit comprises essentially a hollow drive shaft 76 suitably journalled within the lower casing portion 53, which in turn is fitted and bolted, as at the flanged and telescoping joint 80, to the upper obliquely inclined casing portion 52. Within the lower portion of the latter the secondary drive shaft 39 is journalled, being at all times in a driven relationship with the drive shaft 76 through the bevel gear sets 65—66 which are suitably keyed to the respective hollow drive shafts. The drive shaft 76 receives its power from the engine 8 through its power take-off and the splines 79 at the forward end of the hollow drive shaft. The motor 8 is started by engagement of the dog clutch 75 with the starter 7 transmitting the starting torque through the hollow shaft 76 while the clutch is disengaged. The starter flange 7a is attached to the casing 53 by the mounting bolts 7b. The shaft 76 is journalled within the casing 53 by the anti-friction bearing 74 adjacent the dog clutch shouldered end at 75, and has interposed between it and the bevel gear 66, a spacer 73. The shaft 76 is journalled at its forward end in the anti-friction bearing 77, the inner race of which is retained on the splined end of the drive shaft by the lock nut 78, and the outer race retained within the hub portion of the casing 53 by the threaded locking ring 129. A tubular spacer 72 is disposed between the gear 66 and the bearing 77, having riveted thereto a centrifugal disc 70 which picks up lubricant at its lower portion within the lower or sump portion of the casing 53 and throws the lubricant, due to centrifugal force, into the anti-friction bearing 67 within which the tachometer shaft 40 is journalled.

The hollow and oblique drive shaft 39 is suitably shouldered adjacent its lower end such that it houses the anti-friction bearing 67 within which the tachometer shaft 40 is journalled and on the lower end of which is provided a beveled gear 68 which is constantly in mesh with a similar bevel gear 69. The housing or casing 53 is provided with openings at each side to accommodate the tachometer drive which is suitably connected to the tachometer shaft 69a on which the bevel gear 69 is fixed.

A rotatable spider casing 37, which is fixedly attached to the lower element of the universal joint 5 such that it is rotated with the rotor system 1, is journalled on the double ball bearing 38 at the recessed upper end portion 39a of the oblique drive shaft 39, the bearing being retained in position by the retainer ring 60. The tachometer shaft 40 is provided with a washer or guide spacer 41 by which it is centered within the lower portion of the universal 5, and is also provided with a cross pin 42 in suitable bushings 41a whereby it is attached to the spider 37. From the description of the unit thus far it will be noted that there is provided a horizontal power drive shaft 76 which is continually in mesh through the bevel gears 65—66 with the oblique drive shaft 39. There is at the same time a separate transmission system comprising the shaft 4, the universals 5, the spider 37 and the tachometer shaft 40, through its connection 41 and 42, and the bevel gearing 68 and 69 whereby rotation of the blade system is transmitted co-axially and downwardly within the oblique drive shaft 39 through its lower end and out either side of the casing 53 for the operation of a tachometer on which the auto-rotative speed of the blade system is at all times positively indicated.

The oblique shaft 39 is journalled within the casing portion 52—53 by means of the anti-friction bearings 61 and 62. These bearings are maintained in position by the intermediate spacer sleeves 63 and the threaded retainer 61a. The aforementioned bevel gear 65, keyed to the lower end of the shaft 39, is maintained in its axial relationship with the shaft by contact with the inner race of the bearing 61 and retained at its other end by the threaded retaining ring 71 which at the same time retains the outer race of the bearing 67 within which the lower end of the tachometer shaft 40 is journalled. Immediately above the ball bearing 62 the external periphery of the drive shaft 39 is provided with a spline 130 which is selectively engageable by the axially shiftable assembly of the drive unit. This shiftable portion of the unit is shown in cross section in the upper half of Fig. 4 in its lower position in which its splines 132a engage the aforementioned splines 130.

On the opposite side of the central axis of the cross section of this figure the shiftable portion of the drive unit is shown in its extreme upper position in which it has become locked to the spider 37 as will be hereinafter more fully explained. The shiftable assembly of the drive unit comprises essentially a sun gear 29 having external teeth of the spur gear type and having its hub portion splined at 132 and 132a, the sun gear being axially slidable upon the common splines 132 along the synchromesh unit 30. The latter floats on shaft 39 through its bearing or bushing portion 31 which is engageable with the conic portion of the drive shaft 39 at the conical rubbing surface 64. It will also be noted that the synchromesh ball 32 in the upper half of the figure is engaged with the lower ball detent socket 131a of the synchromesh unit 30. The sun gear 29 is continuously in engagement with the synchromesh unit 30 through the relatively long splines 132 which are common to each said sun gear and synchromesh unit and are capable of relative axial movement with respect to each other equivalent to the distances between the ball detents 131a and 131. Similarly the teeth 133 of the sun gear 29 are of such width or face that they are in continual engagement with the adjacent planet gears 35.

In the lower side of the cross section in Fig. 4 the sun gear 29 is shown in its upper position both with respect to the synchromesh unit in which the ball 32 engages the upper detent socket 131 of the synchromesh unit 30, and the latter is in turn disposed in its extreme upper position with respect to the hollow drive shaft 39. In this lower right half of the view, or the upper position of the shiftable assembly, the teeth 133 of the sun gear 29 are in meshing engagement with the mating teeth 59 which are carried by the ring 57 which in turn is fixedly attached to the spider casing 37 by the machine screws 57a.

Before proceeding with the description of the bearing and the related details of the drive unit it will be appropriate to refer to Figs. 5 and 6 for the operation of the shifting mechanism for adjusting the relative positions of the synchromesh unit and the sun gear. The externally mounted operating lever 24, having a pivot pin connection 114 at its outer terminal, fixedly keyed and locked as at 23a to the transverse shaft 23, is provided with an intermediate pivot connection at 115 for connection to a dashpot device 18. The transverse shaft 23 is suitably journalled within the recessed portion of the casing 52, as shown in the longitudinal cross section in Fig. 4, and the axial cross section in Fig. 6, and has suitably keyed thereto at 82 a Y-shaped yoke or lever 81, the spaced arms of which extend on each side of the co-axial assembly comprising the tachometer shaft 40, the drive shaft 39 and the spacer cylinder 63. Suitable pivotal connections are provided at each terminal of the bifurcated arms of the yoke 81 for connection to the operating rods 25 which are connected to the bearing housing 26 by means of the threaded ends 25a of the rods and the terminal lock nuts 27.

It will therefore be seen that as the lever 24 is rocked about the axis of shaft 23, the arms of the yoke 81 will move the rods 25 in a direction substantially parallel to the longitudinal axis of the shaft 39. The bearing 28 which is fixed in housing 26 is fixedly mounted on the sun gear 29 whereby movement of the lever 24 will cause similar movement of the sun gear 29 in an axial direction with respect to the shaft 39, and under certain circumstances with respect to the synchromesh unit 30, as defined by the ball detents. In passing from the detent 131a to the detent 131 the ball 32 will be forced thereinto by the radially acting plungers 33 and the springs 54 which are mounted in the casing 34 on the support pins 55, as more clearly shown in Fig. 5. The effort required to lift the ball 32 out of detent socket 131, exerted by pull on the cable 20, is slightly greater than that to cause the synchromesh member 30 to be forced downward against the small cone clutch 64. Friction generated at this point causes the synchromesh unit 30 and the sun gear 29 to start rotating with a building up of speed until they are rotating at the same speed as shaft 39. At this point a slightly greater effort on the clutch-ring operating lever causes the ball 32 to lift out of the upper detent socket 131 and permits the lower end of female splines 132a of sun gear 29 to engage the male spline 130 of the shaft 39, the ball 32 to engage the detent socket 131a, and the synchromesh unit thereupon moving downwardly and forwardly into the position shown in the upper left half of Fig. 4.

A plurality of planet gears 35 are pivotally mounted upon the spider casing 37 by means of the pins 49 and the anti-friction bearings 49a. These planet gears are mounted for rotation upon axes which are parallel to, and disposed upon a circle about the axis of the sun gear 29 as a centerline and are accordingly continuously in mesh with the sun gear 29 and the outer ring gear 36. The latter is mounted by means of the studs or bolts 56 upon an annular part 48, the outer surface of which is provided with a brake-lining 142.

A ball bearing 50 is mounted within the circular part 48 and is held in place by means of the spacer 134, the ring gear 36 and the aforementioned mounting bolts 56.

At the lower and inner edge of the circular member 48 there is provided an automatic oil retainer in the form of the encased slinger ring shown at 51. The lubricating oil which is thrown into this annular retaining space as a result of the centrifugal forces developed by the rotating elements of the unit are accumulated and drained through the duct indicated by the dotted lines at 135, down into the sump portion of the lower casing 53. The ring gear 36 and annular portion 48 are encircled by an adjacent and concentrically mounted brake band 46 and its attached lining 47, the detailed mounting of which is more completely shown in Fig. 7. A spun housing 43 is fixedly attached to the ring gear 36 through its lip or socket portion at 45; and the upper end of the housing 43 carries an oil seal at 44 which bears upon the hardened insert 136, which in turn is fixedly carried by the spider casing 37.

It will be noted that while the sun gear 29 is in engagement with the rotating shaft 39, the spider casing 37 which carries the planet gears 35 may either be stationary while the ring gear 36 is rotated; or, on the other hand, the ring gear 36 may be held stationary by the brake 46 while the spider casing 37 is rotated; thus prior to the use of the unit 6 as a clutch and with the power on, when the sun gear 29 is engaged with the drive shaft 39, the spider casing 37 and rotor 1 may be stationary while the ring gear 36 together with its appendages, are rotated in the opposite direction to the shaft 39. As soon as the rotation of the ring gear 36 is arrested by application of the brake band 46, and brake shoe 47 on the brake ring 142, the spider casing 37 and the rotor system to which it is connected will be positively driven and rotated at a speed appreciably lower than that of shaft 39.

When the tension in the cable 20 is released and the shiftable unit is returned to its extreme upper position by the action of the spring 112, the sun gear 29 is engaged with the teeth 59 which are attached through the part 57 and the screws 57a to the spider casing 37. The planetary gear system becomes locked since the sun gear 29 is also in engagement with the planet gears 35. In this case the brake ring 142 is in effect directly connected to the rotor spider 37, and the brake band 46 when tightened can then arrest the rotor rotation, regardless of the driven or idle condition of shaft 39.

Fig. 2 shows an elevational view of the external operating mechanism for the drive unit 6 which has just been described, and it will be helpful to also consider Figs. 1 and 7 in a study of Fig. 2. The dashpot 18 is provided with the internal spring 112 for the purpose of providing means for holding the sun gear 29 in its normal uppermost position for its operative engagement with teeth 59. The dashpot 18 is included with the drive unit in order to prevent the spring 112 from forcing the sun gear 29 into too sudden engagement with the teeth 59 at times when the speeds of the two gears are not synchronized. The aforementioned operating lever 24, described in connection with Fig. 6, is interconnected with this dashpot by means of the rod 89 connected at the pivot 115. The spring 112 accordingly acts upon the rod 89 through the pivot 115 of the bellcrank, and through the remaining control system as previously described, to maintain the sun gear 29 in its uppermost position and to permit the use of a cable control as shown at 20, which is attached to the bellcrank 24 at its pivot 114 through the shackle 113.

The push-pull tube 14 for the brake actuating mechanism is pivotally connected to the extremity of lever 13 which in turn is splined to rotate with the double lever 111. One end of the brake band 46 is anchored to the pivot 105 of the common levers 111 which comprises a toggle arrangement for engaging the brake. The pilot-actuated portions of the brake control, as well as the clutch control system, are more clearly shown in Fig. 3, which is an enlarged and amplified view of the operating mechanism shown in Fig. 1. When it is desired to use the drive unit as a clutch for the power drive of the rotor, the member 21 is pulled aft causing the pin 86 which is fixed to the rod end of this lever, to move aft along the slot 87. This motion causes the sun gear 29 to move downwardly and forwardly away from the teeth 59 into engagement with the shaft 39 as shown in the upper left half of Fig. 4. The member 21 is held in this position by rotating it clockwise so that the pin 86 engages in the recess 87a at the aft end of the slot 87. Completion of the engagement of the clutch 6 to transmit power from the engine to the rotor, is now obtained by pulling back on the lever 17 thereby imparting counterclockwise rotation to it and its companion lever 19 to which it is fixed for pivotation, the movement being transmitted through the push-pull tubes 16, the double bellcrank 15 and the lever 14 causing the toggle lever 13 to tighten up the brake band 46 thereby assisting in the engagement of the unit as a clutch by locking ring gear 36 and converting the idling rotation of the planetary gears 35 into power driven rotation of the rotor drive shaft 4. As the clutch lever 17 is pulled back the attached node 85 is forced past the node 137 of the plate 22 which is pivoted at 138. The spring 83 which is anchored to the aircraft structure by means of the bracket 84 permits the plate 22 to pivot freely about its mounting pin 138, except, of course, for such restraint as is exercised by the spring 83. However, if the lever 17 is in its up or engaged position, that is, with the brake "on" and the clutch 6 effective, the pin 86 is not permitted to pass the projecting portion 139 of the plate 22 due to the restraint offered by the node 85 of the lever 17. In other words, the clutch 6 cannot be disengaged while the brake is in the "on" position. Likewise, when member 21 and lever 17 are engaged as shown in Fig. 3, the clutch member 21 cannot be disengaged without also disengaging lever 17, that is, should the pin 86 of lever 21 come out of the recessed part of slot 87 it would fall against the projection 139 of the plate 22. This obstruction would not permit the member 21 to move inwardly and thereby would not permit the sun gear 29 to move into engagement with the teeth 59 of the spider casing 37. The member 21 is telescopically guided within the supporting structure 88 and is provided with a suitable terminal connection for attachment of the cable 20.

Fig. 7 shows an enlarged view of the operating mechanism for the brake, the mechanism being supported upon the lug 108 which forms a part of the casing 52, projecting outward and upward from the assembly illustrated in Fig. 4. On the upper extremity of the lug 108 there is mounted a triangular plate 107 by means of the bolts 140 and at the upper apex of the triangular plate 107 the rotatable structure 93 is pivotally mounted at the bearing 102. This structure is held in contact with adjusting pin 97 at its rounded contact area at 99 by means of the tension spring 92 which is attached to a structure plate 93 at the pivot 94. The spring 92 is adjustable as to the tension it exerts in causing the point 99 to bear against the plate 93, this tension being adjusted by means of the adjusting nut 95. The lower end of spring 92 is attached to structure plate 96 which in turn is attached to the lug 108 by the adjusting pin 97 and the machine screw 141. The static position of the plate 93 may be altered by adjustment of nut 98 on the adjusting pin 97 and the plate 93 also carries pivots 101 and 106. The clutch-brake band 46 is adjustable through the adjusting pin 100 at pivot 101 threadedly engaging the nut element 110; the lower end of adjusting pin 100 being free to turn in circular block 109 about which the end of the brake band 46 is attached at 91. The lug 108 is provided with an aperture, through which the adjusting pin 100 passes to its straddle mount 110 at the pivot 101.

The pivot 106 of the plate 93 carries the assembly operating lever arm 13 and the double lever arms 111 to which the other end of the brake band 46 is attached at its terminal connection at the pivot 105. When the brake band 46 is in the engaged position, as indicated by the solid lines in Fig. 7, the back side of levers 111 rest against the adjusting pin 103 at its contact point 104. The pin 103 is adjusted such that the centerline of the straight portion of the brake band 46, shown at 90, passes from the pivot 105 just below pivot 106, that is, beyond its dead center. It will be seen that the tension in the brake band would tend to keep the lever 13 in the engaged position when the line of force passes below pivot 106. This forces lever 111 against the adjustment pin 103 at the contact 104, the proper amount of toggle being adjusted as desired by rotation of the adjusting screw 103. When the lever 13 is in the "off" position levers 111 move into the upper dotted position and cause a relative lengthening of the brake band 46 permitting it to disengage the lining 142 of the circular element of the ring gear 48.

When the plate 93 is properly adjusted at 97 the centerline passing through the pivots 105 and 106, in the engaged position of the brake, should be the same distance from the pivot 102 as the centerline of the adjustment pin 100 is from pivot 102. With this adjustment the forces derived from the initial tension in the brake band 46 are equalized or balanced on the plate 93 causing no tendency to rotate this structure about its pivot 102. However, when the torque is transmitted through the clutch unit 6 a force is generated tending to rotate the circular member 48 which is held stationary by the clutch band 46. This force is transmitted to the brake band 46 as tension in the adjusting screw 100 and a relief of the initial tension in the end of the brake band shown at 90. It may be seen that this inequality of the forces transmitted to the plate 93 will place a force on said plate tending to oppose the force of the spring 92 which is holding plate 93 against the stop 99 on the adjusting pin 97. When the inequality or difference between the forces in the two ends of the brake band is sufficient to cause rotation of the plate 93 about its pivot 102 against the spring force 92, pivot 106 will also be rotated downward relative to the fixed lug 108 and the adjusting screw 103. This downward motion of pivot 106, which carries the inner pivot of levers 111, causes these levers to rotate upward about pin 106 because of the contact with the adjusting screw 103 at the contact 104. When the line of tension from the end of the brake band 90 moves to a position above the pivot 106, the lever 13 will be permitted to rotate in a clockwise direction to automatically disengage the brake band 46 and lining 47. Thus when a predetermined value of torque has been reached the brake band will automatically become disengaged.

In a modification the tension spring 92 might be replaced by a compression spring having the lower convolution engaging the upper surface of movable structure 93, and the upper convolution engaging an upward extension of the fixed support. Any suitable means other than an elastic body or spring, such as a piston and cylinder or the like which will movingly oppose movement between the fixed support and the movable plate 93, may be used, and if desired, calibrating means may be associated with the opposing means to indicate the torque. It will be noted that no sliding friction occurs between the circular member 48 and band 46 during automatic disengagement due to excessive driving torque.

Returning now to Fig. 3, it will be noted that when the brake lever 17 is moved forward into the disengaged position, the node 85 of the lever 17 engages the node 137 of the plate 22, causing the projection 139 of the plate 22 to force the pin 86 from the detent slot and into the straight slot 87. The spring 112 of the dashpot shown in Fig. 2 will pull the member 21 forward until the pin 86 meets the forward end of slot 87; thus when the clutch unit 6 is disengaged the synchromesh unit automatically moves into its upper position for engagement as a locked unit. The operation of the brake unit is similar to that which has just been described above with the exception that the synchromesh member 21 is not required to be operated.

The operation of the drive and control mechanism for imparting initial rotation to the rotor system is as follows:

With the synchromesh unit and sun gear in its upper normal disengaged position with respect to the drive shaft 39, and the brake band also in its disengaged position, the starter 7 is engaged with the main horizontal drive shaft 76 by engagement of the intervening dog clutch 75. Upon starting of the aircraft engine the starter is disengaged and rotation of the main drive shaft 76 imparts rotation to the oblique drive shaft which is the only portion of the drive unit which is rotated at this time. The manual clutch operating member 21 is then drawn out and rotated into its engaged position in which the synchromesh unit 30 and the associated sun gear 29 is moved downwardly until it engages and rotates with the oblique drive shaft. When the clutch 6 has been fully engaged rotation of the sun gear will impart rotation of the planet gears about their separate axes while the supporting spider 37 remains idle, the rotation of the planet gears imparting rotation to the ring gear 36 and its associated ring portion 48. The manual lever for the brake actuation is now rotated into its upper or "on" position in which the brake band is tightened upon the ring gear portion, the rotation of which is gradually arrested and as this occurs the planet gears impart rotation to the rotor spider 37 on which they are mounted and the rotor system 1 is accordingly rotated.

Substantially concurrently with initiation of the forward run before take-off due to traction of propeller 9, the manual brake handle is released and the synchromesh unit and sun gear are automatically disengaged from the drive shaft 39 thereby permitting continued autorotation of the rotor. As the synchromesh unit and associated sun gear reach its upper normal position, the continued autorotation of the spider 31 imparts idling rotation to both the sun gear and the ring gear with which its planetary gears are continuously in mesh and now locked as a unit. In this condition the brake can be applied without adjustment of the clutch control. Assuming that at the end of a normal flight in which the blade system has been auto-rotating and it is desired to arrest the rotation of the same, the synchromesh unit and the sun gear would normally be in its upper position disengaged from the inclined drive shaft and engaged to or locked with the spider element, and the brake would be in its "off" position. With the sun gear in this locked position where it prevents relative rotation of the planet gears with the spider element and in which the sun gear, planet gears, ring gear and the spider all rotate together as a single assembly, the rotation of the manual brake operating lever applying the brake band to the ring gear portion will arrest the rotation of the rotor system regardless of the operation of the power plant and the inclined drive shaft with which it is directly connected. Regardless of the setting of the brake or the clutch means it should be noted that the tachometer drive through its shaft 40 is always directly connected to the rotor such that its true speed is always indicated.

In Fig. 8 there is disclosed a modification in which an engine or other source of power 116 is provided with an automatic releasing clutch 117, supported by the structure 118, and which is adapted to releasably transmit power from the source 116 through the shaft 119 to the power receiving unit 120, which may be a generator or other driven device. The operation and general purposes of the use of the clutch unit 117 are substantially the same as in the clutch unit 6 described above for use in aircraft.

Fig. 9 shows a modification of the present invention adapted for the operation of flaps 122, or other surfaces, on the wings 121 of an airplane. In this modification the source of power or energy is illustrated at 128, the automatic torque releasing clutch is indicated at 127 which transmits the power from the source 128 through the shaft 126 and its attached pinion 125 to the bevel gear 124, which in turn transmits the torque to the shaft 123, and imparts suitable extension or retraction of the flaps 122 by any suitable interconnection of which several are now in common use, such that the disposition of the flaps will have the desired aerodynamic effect upon the aircraft wing system indicated generally at 121.

Other advantages and forms of the present invention, both with respect to its general arrangement and details, which may become obvious to those versed in the art, are intended to fall within the scope and embrace of the present invention as more particularly defined in the appended claims.

We claim:

1. In an aircraft having a power plant and a rotary sustaining system, the combination of a selectively operated clutch assembly for the operative engagement and disengagement of said sustaining system and said power plant, said assembly including a planetary gearing device, a first manually operated means applicable to said planetary device adapted for the effectuation of said clutch when applied in its engaging condition with said power plant, a second manually operated means arranged for the braking of the rotation of said sustaining system in the disengaged condition of said clutch from said power plant, and interlocking means associated with each said manual means adapted to prevent the disengagement of said clutch assembly while the said manually operated means is applied to said planetary device for the effectuation of said clutch operation.

2. In an aircraft having a rotor system and propulsive power plant, transmission means operatively connected with said power plant and said rotor system, said transmission means including a manually operated clutch assembly for selective engagement with said power plant or said rotor system and a planetary gear device in engagement with said clutch assembly in each of its selective conditions, a manually operated means associated with said planetary device adapted by engagement with the same for the power drive of said rotor system in the power-driven engaged condition of said clutch assembly, said manually operated means adapted for the braking of the rotation of said rotor system in the position of said clutch in which it is engaged with said rotor system, and interlocking means adapted to prevent disengagement of said clutch assembly from said power plant while said manually operated means is in engagement with said planetary device.

3. In a transmission control arrangement of the planetary gear type adapted for the selective drive of a rotative wing system from a power source, a power-driven shaft, a clutching member axially shiftable with respect to said shaft and said rotative wing system such that it is separately engageable with each, a first manually operated means for axially shifting said clutching member, planetary gears pivotally mounted for rotation with said rotative wing system, inner gear means carried by said clutching member having teeth in continual mesh with said planetary gears, outer gear means coaxially journalled about said first gear means also in continual mesh with said planetary gears, said outer gear means provided with an external braking surface, and a second manually operated means engageable with said braking surface adapted upon arresting rotation of said outer gear means to provide the selective drive for said rotative wing system from said power-driven shaft in the engaged condition of said clutching member with said shaft, arranged in such manner that the second said manually operated means upon like arresting rotation of said outer gear means is adapted to brake said rotative wing system in the oppositely shifted position of said clutching member in which it is engaged with said rotative wing system and interlocking means associated with each said manual means adapted to prevent the disengagement of said clutching member while the second said manually operated means is applied to said external braking surface of said outer gear means for the effectuation of said clutch operation.

4. In control mechanism for a drive system including a shiftable clutch assembly, a driven assembly, a planetary gear set carried by said driven assembly in continuous engagement with said clutch assembly, a ring gear engaging said planetary gear set, control means for effectuating said clutch operation and braking the rotation of the driven assembly, including manual means for the operation of said clutch into engagement with the drive or driven system, manual means for the actuation of said brake by arresting rotation of said ring gear, and interlocking means associated with each said manual means adapted to prevent the disengagement of said clutch means while the said control means is in the braking condition of said driven assembly.

5. In a rotative wing aircraft, the combination with a drive for a rotative wing system, including a relatively fixed housing, a driving shaft provided with a clutching portion journaled within said housing, a driven assembly provided with a set of planetary gears pivotally mounted thereon, a shiftable assembly having teeth in continual meshing engagement with said planetary gears and a portion selectively engageable with the clutching portion of said driving shaft, a clutch portion carried by said driven assembly, a ring gear in continual meshing engagement with said planetary gears, brake means engageable with said ring gear adapted to arrest rotation thereof with respect to said housing for the clutching engagement of said driving shaft and said driven assembly in one position of said shiftable assembly, and the braking of rotation of said driven assembly in the other position of said shiftable assembly, and adjustable means adapted to automatically release said brake means in both its clutching and braking conditions.

6. In an aircraft having a power plant and a rotary sustaining system, the combination of a selectively operable clutch for engagement and disengagement of said sustaining system with respect to said power plant, and planetary gearing pivotally carried by said sustaining system in continual engagement with said clutch, with manually-operated means adapted for the effectuation of said clutch in its engaged condition by providing resistance to idling rotation of said planetary gearing and the braking of the rotation of said sustaining system by arresting rotation of said planetary gearing when said clutch is disengaged from said power plant and in direct engagement with said rotary sustaining system, and adjustable means adapted to automatically release said brake means in both its clutching and braking conditions.

7. In an aircraft having a rotatable sustaining system, a power plant for the selective drive of said sustaining system, transmission means operatively connected with said power plant and said sustaining system including a combined brake and clutch unit, a relatively fixed housing within which said transmission means is journaled, an axially shiftable assembly carried by said unit alternatively engageable with said power-driven transmission and said sustaining system, manual means engageable with said combined unit by fixation of the same with respect to said housing for completion of the clutching engagement of said assembly between said power plant and said sustaining system and automatic means associated with said manual means adapted to release the same upon the application of torque of a predetermined magnitude to said transmission system.

8. The combination with an aircraft having a propulsive power plant and a rotary sustaining system, of planetary drive mechanism interconnected with said power plant for initiating rotation of said rotor system, said drive mechanism including a ring gear, a clutch assembly shiftably associated with respect to said drive mechanism, said clutch assembly including teeth engageable with said drive mechanism, a band brake engageable with said ring gear for the selective clutching of the said rotary sustaining system to said power plant, and the arrest of the rotation of said rotary system, determined by the position of said shiftable clutch and an axially disposed transmission mechanism drivably connected to said rotor system and journalled within said drive mechanism for the rotative speed indication of said rotary system regardless of its driving relationship with respect to said power plant.

9. The combination in an aircraft as set forth in claim 6 characterized by the inclusion of a speed-indicating transmission axially disposed within said clutch drivably connected to said sustaining system for positive rotation therewith regardless of the driving relationship of said sustaining system with said power plant.

10. In a power transmission for an aircraft having a propulsive motor and a rotor system for the sustention of said aircraft, two-position selective clutch means alternatively shiftable for operative engagement with said motor or said rotor system, manual control means adapted for the control of said clutch means to initiate the power drive of said rotor system by said motor in a first position of said clutch means in engagement with said motor, a further manual control means adapted for the completion of said power drive condition in said first position of said clutch means and alternatively adapted for the braking of said rotor system in a second shifted position of said clutch means when in operative engagement with said rotor system, and interlocking means associated with each said manual control means arranged to automatically prevent disengagement of said clutch control means when said further control means is in its said first engaged position for the completion of said power drive condition.

CHARLES C. MILLER.
RICHARD H. PREWITT.

REFERENCES CITED

The following references are of record in the file of this patent:

UNITED STATES PATENTS

| Number | Name | Date |
|---|---|---|
| 2,116,013 | Carson et al. | May 3, 1938 |
| 2,259,437 | Dean | Oct. 21, 1941 |
| 311,255 | Pedersen | Jan. 27, 1885 |
| 1,765,822 | Bronander | June 24, 1930 |
| 1,688,186 | Humphreys | Oct. 16, 1928 |
| 1,655,704 | Kauffman | Jan. 10, 1928 |
| 1,706,109 | Dodge | Mar. 19, 1929 |
| 2,235,192 | Bailey | Mar. 18, 1941 |
| 2,340,241 | Woods | Jan. 25, 1944 |
| 1,999,636 | Pecker | Apr. 30, 1935 |
| 2,000,904 | Pecker | May 14, 1935 |
| 2,131,348 | Hafner | Sept. 27, 1938 |
| 2,265,070 | Goode | Dec. 2, 1941 |

FOREIGN PATENTS

| Number | Country | Date |
|---|---|---|
| 384,758 | Great Britain | Dec. 15, 1932 |
| 452,922 | Great Britain | Sept. 1, 1936 |